(12) United States Patent
Meza et al.

(10) Patent No.: US 10,603,971 B2
(45) Date of Patent: Mar. 31, 2020

(54) RATE LEAF SPRING VEHICLE SUSPENSION SYSTEM

(71) Applicant: Rassini Suspensiones, S.A. de C.V., Del. Miguel Hidalgo (MX)

(72) Inventors: Jesus Ernesto Meza, Coahuila (MX); Jose G. Ruiz Juarez, Coahuila (MX); Anthony Berlingieri, Plymouth, MI (US); Ramón Diego-Guedea, Ann Arbor, MI (US); Alejandra Julieta Monsivais Barron, Troy, MI (US); Juan Jose Wong, Coahuilla (MX)

(73) Assignee: Rassini Suspensiones, S.A. de C.V. (MX)

( * ) Notice: Subject to any disclaimer, the term of this patent is extended or adjusted under 35 U.S.C. 154(b) by 143 days.

(21) Appl. No.: 15/826,211

(22) Filed: Nov. 29, 2017

(65) Prior Publication Data
US 2018/0147904 A1 May 31, 2018

Related U.S. Application Data

(60) Provisional application No. 62/428,201, filed on Nov. 30, 2016.

(51) Int. Cl.
*B60G 11/12* (2006.01)
*B60G 11/04* (2006.01)
*B62D 21/11* (2006.01)
*B62D 21/02* (2006.01)

(52) U.S. Cl.
CPC ............ *B60G 11/125* (2013.01); *B60G 11/04* (2013.01); *B62D 21/02* (2013.01); *B62D 21/11* (2013.01); *B60G 2200/422* (2013.01); *B60G 2202/112* (2013.01); *B60G 2204/121* (2013.01); *B60G 2204/41* (2013.01); *B60G 2204/4502* (2013.01); *B60G 2204/61* (2013.01); *B60G 2206/7101* (2013.01)

(58) Field of Classification Search
CPC .. B60G 11/125; B60G 11/04; B60G 2204/61; B60G 2204/4502; B60G 2200/422; B60G 2206/7101; B60G 2202/112; B60G 2204/41; B60G 2204/121; B62D 21/02; B62D 21/11
See application file for complete search history.

(56) References Cited

U.S. PATENT DOCUMENTS 2,815,945 A * 12/1957 Green .................... B60G 11/02
267/45
2,861,798 A * 11/1958 Lenet ..................... B60G 11/04
267/45
2,969,230 A * 1/1961 Scheublein, Jr. ......... F16F 1/22
267/233

(Continued)

*Primary Examiner* — Darlene P Condra
(74) *Attorney, Agent, or Firm* — Dickinson Wright PLLC (57) ABSTRACT

A variable rate leaf spring vehicle suspension system includes a chassis rail. Also included is a leaf spring operatively coupled at a first end and a second end to the chassis rail, the leaf spring formed of a composite material. Further included is a first bumper operatively coupled to the leaf spring, the first bumper spaced from the chassis rail in a first condition of the leaf spring and configured to provide a first spring rate, and in contact with the chassis rail in a second condition of the leaf spring, contact between the first bumper and the chassis rail configured to provide a second spring rate of the leaf spring.

14 Claims, 6 Drawing Sheets

(56) References Cited

U.S. PATENT DOCUMENTS

| | | | | |
|---|---|---|---|---|
| 3,312,459 | A * | 4/1967 | Pence | B60G 7/04 267/45 |
| 4,750,718 | A * | 6/1988 | Nickel | B60G 11/40 267/149 |
| 2002/0130474 | A1 * | 9/2002 | Richardson | B60G 5/00 280/5.507 |
| 2005/0051933 | A1 * | 3/2005 | Platner | B60G 7/04 267/38 |
| 2009/0115157 | A1 * | 5/2009 | Platner | B60G 11/107 280/124.176 |
| 2012/0200057 | A1 * | 8/2012 | Juriga | B60G 9/00 280/124.116 |
| 2014/0035248 | A1 * | 2/2014 | Dilworth | B60G 11/04 280/124.106 |
| 2015/0145187 | A1 * | 5/2015 | Soles | B60G 11/42 267/30 |

* cited by examiner

RATE LEAF SPRING VEHICLE SUSPENSION SYSTEM

CROSS-REFERENCE TO RELATED APPLICATIONS

This patent application claims priority to U.S. Provisional patent Application Ser. No. 62/428,201, filed Nov. 30, 2016, which is incorporated herein by reference in its entirety.

FIELD OF THE INVENTION

This invention relates generally to leaf spring suspension systems for vehicles.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

One effort to address the problems associated other suspension systems employs a parallel leaf spring arrangement to provide a second stage spring rate of the system. In today's marketplace, many vehicle manufacturers desire weight reduction to assist in fuel efficiency efforts. Unfortunately, the additional spring arrangement to be disposed in parallel with a primary spring adds weight.

SUMMARY OF THE INVENTION

According to one embodiment, a variable rate leaf spring vehicle suspension system includes a chassis rail. Also included is a leaf spring operatively coupled at a first end and a second end to the chassis rail, the leaf spring formed of a composite material. Further included is a first bumper operatively coupled to the leaf spring, the first bumper spaced from the chassis rail in a first condition of the leaf spring and configured to provide a first spring rate, and in contact with the chassis rail in a second condition of the leaf spring, contact between the first bumper and the chassis rail configured to provide a second spring rate of the leaf spring.

According to another embodiment, a variable rate leaf spring vehicle suspension system includes a chassis rail. Also included is a leaf spring arrangement. The leaf spring arrangement includes a first leaf spring operatively coupled at a first end and a second end to the chassis rail. The leaf spring arrangement also includes a second leaf spring coupled to the first leaf spring in a stacked arrangement, at least one of the first leaf spring and the second leaf spring formed of a composite material. The leaf spring arrangement further includes a first bumper operatively coupled to the second leaf spring, the first bumper spaced from the first leaf spring in a first condition of the leaf spring arrangement and in contact with the first leaf spring in a second condition of the leaf spring arrangement.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
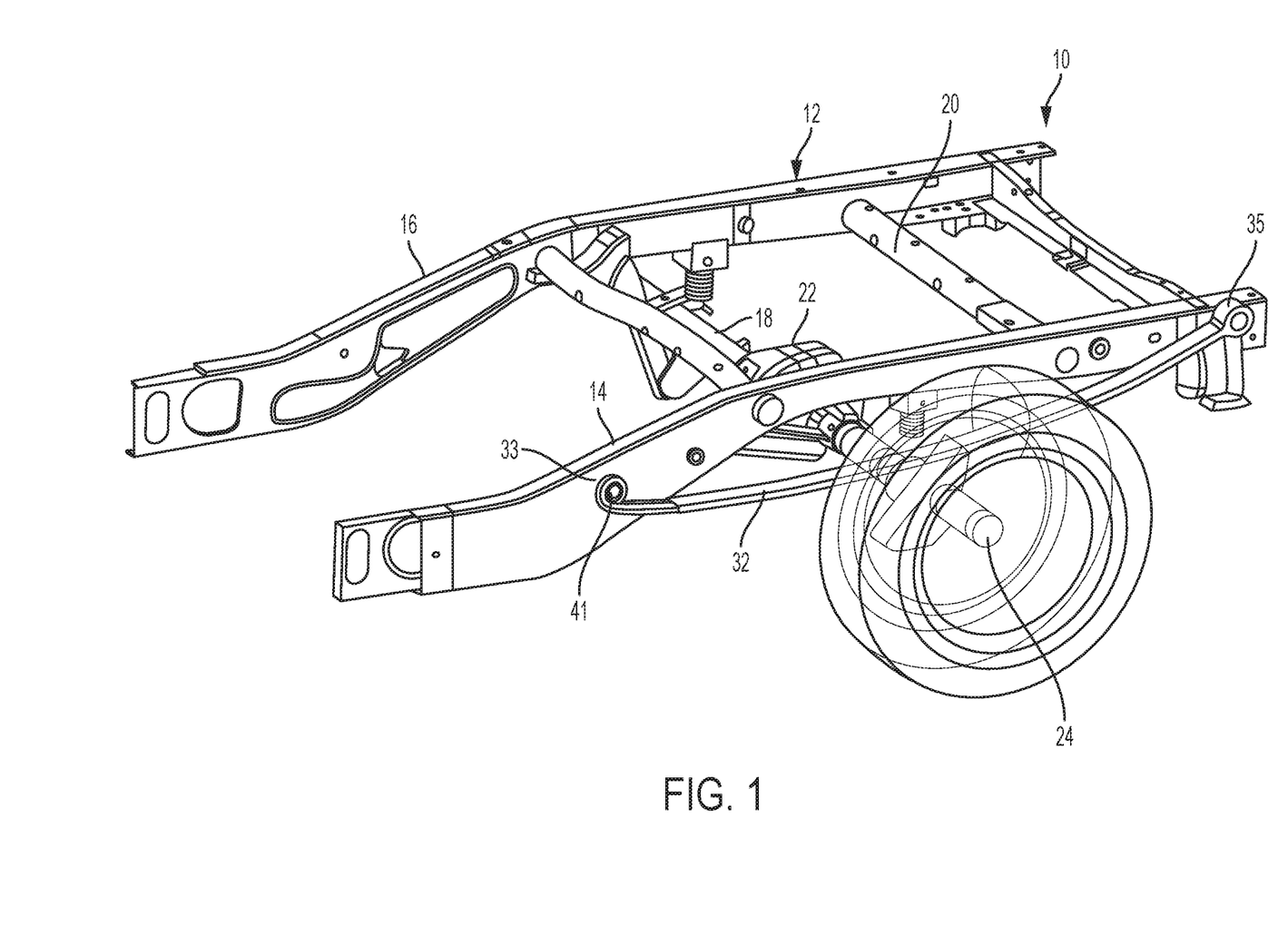
FIG. 1 is a perspective view of a vehicle suspension system.
Figure 2:
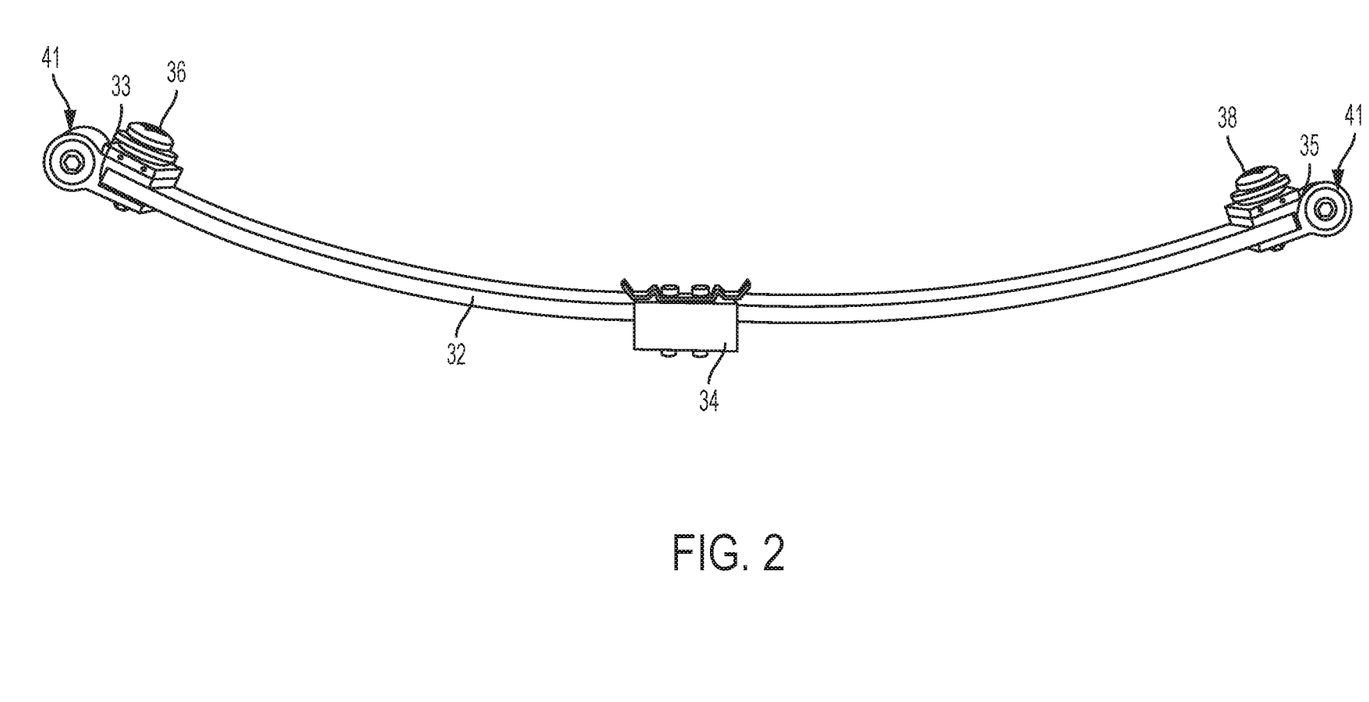
FIG. 2 is a side, elevational view of a leaf spring of the vehicle suspension system.
Figure 3:
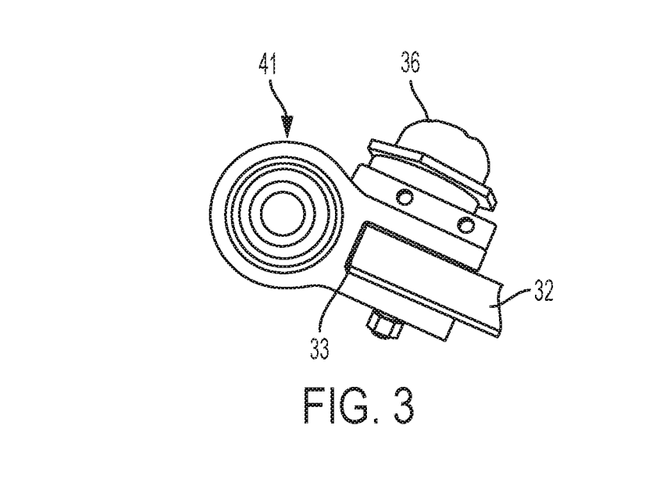
FIG. 3 is a side, elevational view of a first end of the leaf spring having a bumper thereon.
Figure 4:
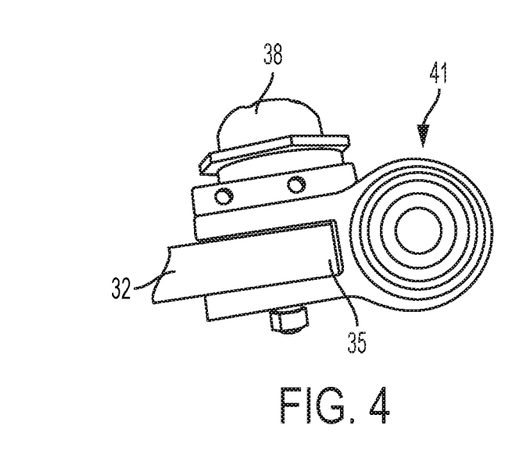
FIG. 4 is a perspective view of the first end of the leaf spring.
Figure 5:
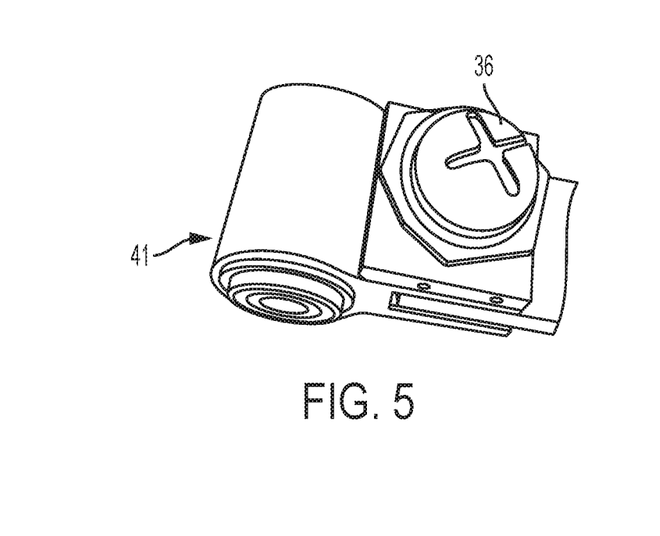
FIG. 5 is a side, elevational view of a second end of the leaf spring having a bumper thereon.
Figure 6:
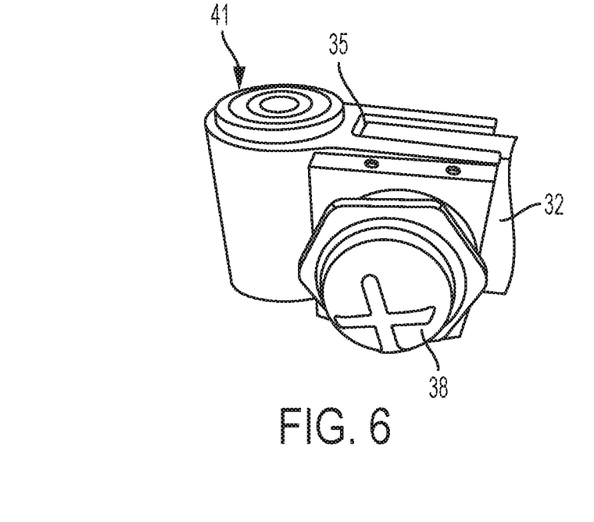
FIG. 6 is a perspective view of the second end of the leaf spring.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at shaft 24 which may also be referred to as an axle. The shaft 24, also referred to as an axle herein, includes an associated pair of universal joints (not specifically designated) that are arranged to be proximal and distal with respect to the differential drive arrangement 22. Thus, the shaft 24 has an associated longitudinal axis to accommodate transaxial motion. It is to be appreciated that the shaft 24 refers to a pair of half shafts in some embodiments. The half shafts may be disposed within a single sleeve or uncovered.

A leaf spring 32 is operatively coupled at a first end 33 and a second end 35 to the chassis rail 14. In particular, the leaf spring 32 is coupled to the chassis rail 14 in a fixed manner with any suitable coupling element. In some embodiments, the leaf spring 32 is operatively coupled, at least in part, to the chassis rail 14 with an eye spring bushing arrangement 41. For purposes of discussion, only leaf spring 32 has been described in detail, but it is to be appreciated that a corresponding leaf spring is located on an opposing side of the chassis 12 proximate chassis rail 16.

The above-described spring 32 may be referred to as a "semi-elliptical" spring configured as an arc-shaped length segment. The spring is formed of a composite material to reduce the weight of the leaf spring 32 when compared to traditional steel spring arrangements.

Referring now to FIGS. 2-6, the leaf spring 32 is illustrated in greater detail. Disposed between the first end 33 and the second end 35 of the leaf spring 32 is a cage 34 to operatively couple the leaf spring 32 to the shaft 24. A first bumper 36 is located proximate the first end 33 of the leaf spring 32. The first bumper 36 may be operatively coupled to, or integrally formed with, the eye spring bushing arrangement 41 or the leaf spring 32 itself. Location of the first bumper 36 being proximate to the first end 33 of the leaf spring 32 is defined by the first bumper 36 being located closer to the first end 33 relative to a mid-point of the leaf spring 32. Similarly, a second bumper 38 is located proximate the second end 35 of the leaf spring 32. The second bumper 38 may be operatively coupled to, or integrally formed with, the eye spring bushing arrangement 41 or the leaf spring 32 itself. Location of the second bumper 38 being proximate to the second end 35 of the leaf spring 32 is defined by the second bumper 38 being located closer to the second end 35 relative to a mid-point of the leaf spring 32. Each of the bumpers 36, 38 may be formed of any suitable material, including rubber, for example.

Figure 7:
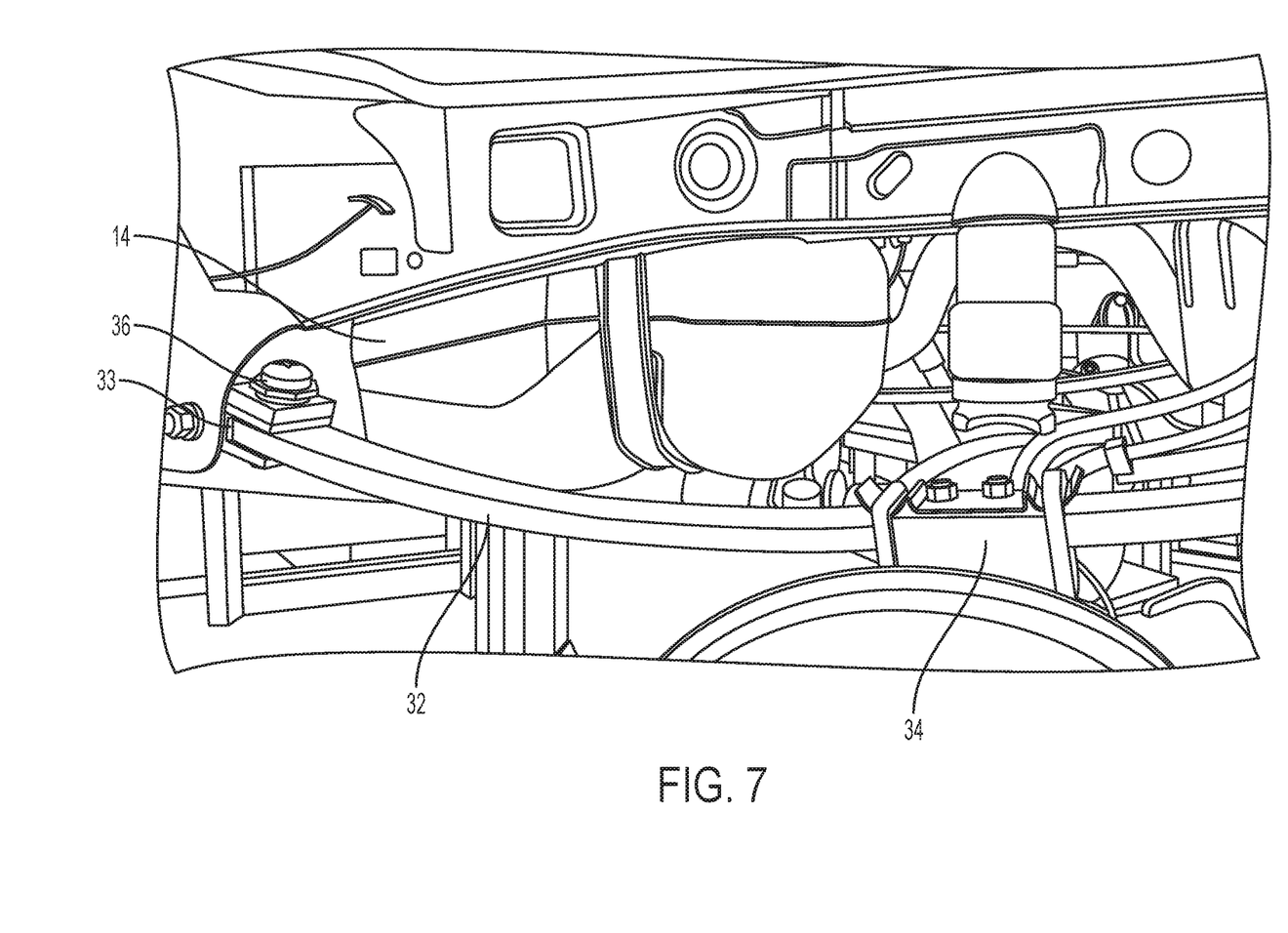
FIG. 7 is a perspective view of the leaf spring with the first end coupled to a chassis rail of the vehicle suspension system.
Figure 8:
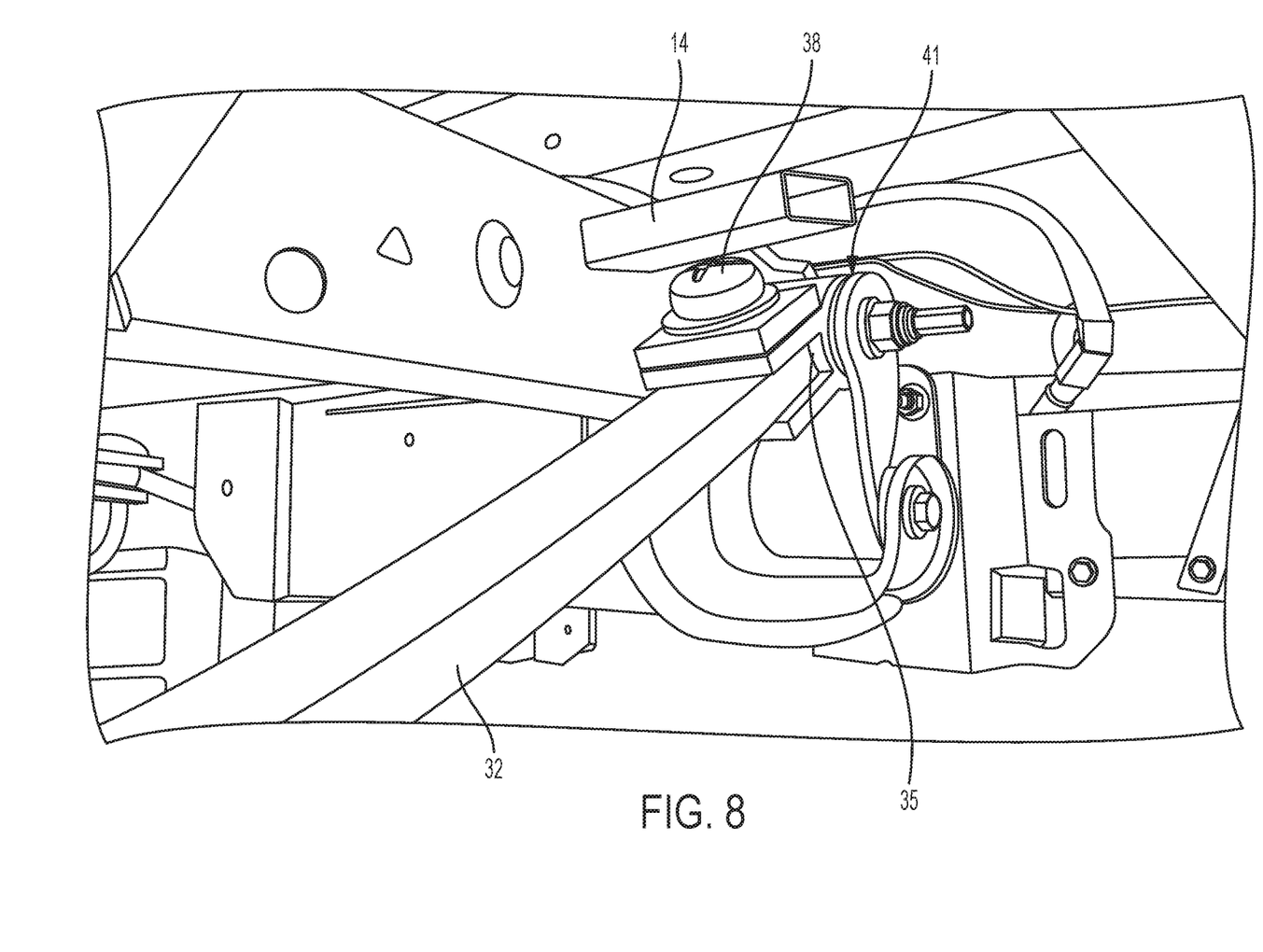
FIG. 8 is a perspective view of the leaf spring with the first end coupled to a chassis rail of the vehicle suspension system.

The bumpers 36, 38 are positioned on the leaf spring 32 (or eye spring bushing arrangement 41) to contact the chassis rail 14 during certain deflections of the leaf spring 32 in response to various movements of the vehicle, such as acceleration, braking, lateral movement due to turning maneuvers, movement due to changing road surfaces, etc. The bumper 36 at the first end 33 of the leaf spring 32 is shown in close proximity to the chassis rail 14 in FIG. 7 and the bumper 38 at the second end 35 of the leaf spring 32 is shown in close proximity to the chassis rail 14 in FIG. 8.

Engagement of one or both of the bumpers 36, 38 with the chassis rail 14 in response to spring deflection relative to chassis rail 14 initiates a second spring rate of the leaf spring 32 to provide desirable spring characteristics that facilitate specified suspension dynamics. The precise location of the bumpers 36, 38 along the length of the leaf spring 32 may be adjusted to determine how much spring deflection is required before contact between the bumpers 36, 38 and the chassis rail 14 occurs. Initiation of the second spring rate of the leaf spring 32 may be adjusted based on the location of the bumpers 36, 38. Such an arrangement provides flexibility of the spring response characteristics, while avoiding the need for a second leaf spring arrangement, thereby reducing the weight of the suspension system 10 and the overall vehicle.

Figure 9:
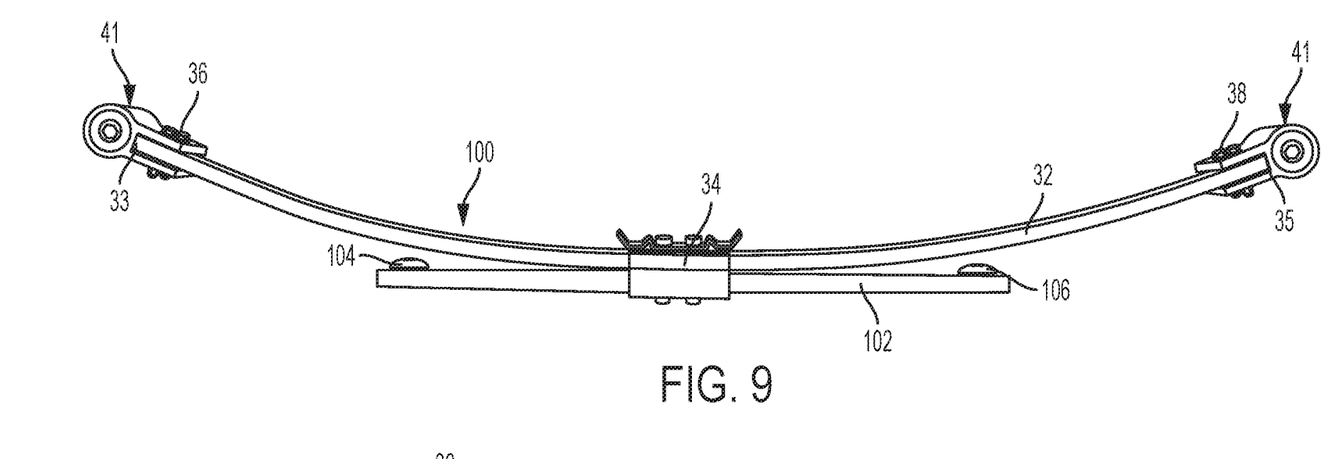
FIG. 9 is a side, elevational view of the leaf spring in a stacked arrangement according to another aspect of the invention.
Figure 10:
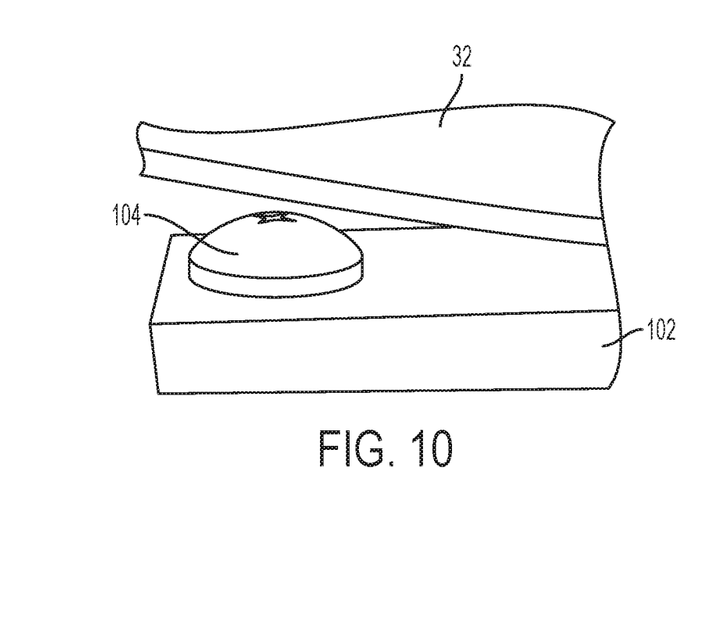
FIG. 10 is a perspective view of the stacked arrangement of FIG. 9 illustrating a first bumper.
Figure 11:
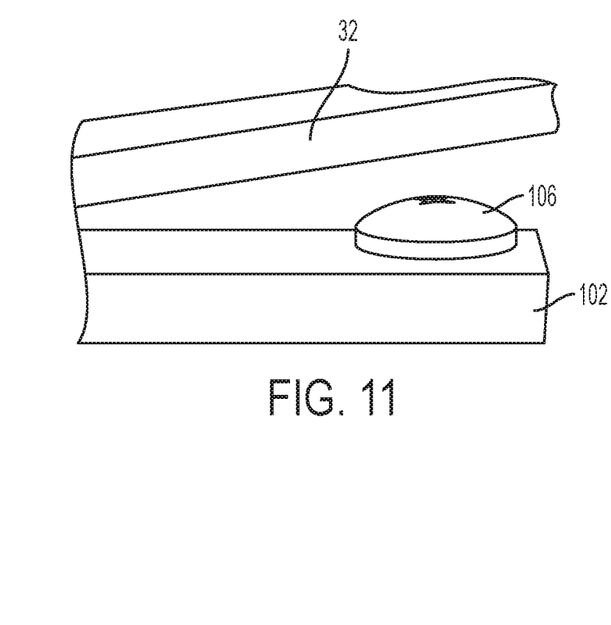
FIG. 11 is a perspective view of the stacked arrangement of FIG. 10 illustrating a second bumper.

Referring now to FIGS. 9-11, another aspect of the invention is disclosed. A leaf spring arrangement 100 having a stacked arrangement of leaf springs is illustrated. In the illustrated embodiment, an additional leaf spring 102 is clamped to the leaf spring 32 with the cage 34 in a stacked arrangement. The additional leaf spring 102 does not extend a distance that spans an entirety of the leaf spring 32. Bumpers 104, 106 are fixed to the additional leaf spring 102 proximate ends thereof on a side of the additional leaf spring that is adjacent the leaf spring 32. As shown, in a relaxed condition of the leaf spring arrangement 100, the bumpers 104, 106 are spaced from the leaf spring 32.

Engagement of one or both of the bumpers 104, 106 with the leaf spring 32 in response to spring deflection initiates a third spring rate of the leaf spring arrangement 100 to provide desirable spring characteristics that facilitate specified suspension dynamics. The precise location of the bumpers 104, 106 along the length of the additional leaf spring 102 may be adjusted to determine how much spring deflection is required before contact between the bumpers 104, 106 and the leaf spring 32 occurs. Initiation of the third spring rate of the additional leaf spring 102 may be adjusted based on the location of the bumpers 104, 106. As with the bumpers 36, 38 of the leaf spring 32, such an arrangement provides flexibility of the spring response characteristics, while avoiding the need for a second leaf spring arrangement, thereby reducing the weight of the suspension system 10 and the overall vehicle.

The order of engagement of the bumpers 36, 38 of the leaf spring 32 with the chassis rail 14 relative to engagement of bumpers 104, 106 with the leaf spring 32 may be adjusted to control the spring response characteristics. In other words, bumpers 36, 38 engage the chassis rail 14 prior to engagement of the bumpers 104, 106 with the leaf spring 32 in some embodiments. In other embodiments, bumpers 104, 106 engage the leaf spring 32 prior to engagement of the bumpers 36, 38 with the chassis rail 14 in some embodiments. The use of the bumpers at the eye spring arrangement location avoids undesirable contact and rubbing of components with the composite material. Such contact and rubbing is detrimental to a composite spring and is a consideration that is not of concern to steel spring arrangements.

Although two springs are illustrated and described herein, it is to be understood that more than two leaf springs may be included in the stacking of leaf spring arrangement 100. Additional leaf springs may also include bumpers that engage adjacent leaf springs of the stacked arrangement to further control the spring response characteristics.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

Having thus described the invention, it is claimed:

1. A variable rate leaf spring vehicle suspension system comprising:
   a chassis rail;
   a leaf spring operatively coupled at a first end and a second end to the chassis rail, the leaf spring formed of a composite material;
   a first bumper operatively coupled to the leaf spring, the first bumper spaced from the chassis rail in a first condition of the leaf spring and configured to provide a first spring rate, and in contact with the chassis rail in a second condition of the leaf spring, contact between the first bumper and the chassis rail configured to provide a second spring rate of the leaf spring, the first bumper located proximate the first end of the leaf spring; and
   a second bumper operatively coupled to the leaf spring and located proximate the second end of the leaf spring.

2. The system of claim 1, further comprising a cage operatively coupling the leaf spring to a vehicle axle.

3. The system of claim 1, wherein the first bumper is formed of rubber.

4. The system of claim 1, wherein the first bumper and the second bumper are each formed of rubber.

5. The system of claim 1, wherein the leaf spring is operatively coupled to the first end of the chassis rail with a first eye spring bushing, the leaf spring operatively coupled to the second end of the chassis rail with a second eye spring bushing.

6. The system of claim 5, wherein the first bumper is coupled to the first eye spring bushing.

7. The system of claim 1, wherein the first bumper is directly coupled to the leaf spring.

8. A variable rate leaf spring vehicle suspension system comprising:
   a chassis rail; and
   a leaf spring arrangement comprising:
   a first leaf spring operatively coupled at a first end and a second end to the chassis rail;
   a second leaf spring coupled to the first leaf spring in a stacked arrangement, at least one of the first leaf spring and the second leaf spring formed of a composite material;
   a first bumper operatively coupled to the second leaf spring, the first bumper spaced from the first leaf spring in a first condition of the leaf spring arrangement and in contact with the first leaf spring in a second condition of the leaf spring arrangement, the first bumper located proximate an end of the second leaf spring;
   a second bumper operatively coupled to the second leaf spring and located proximate an end of the second leaf spring opposite the end that the first bumper is located; and
   a third bumper operatively coupled to the first leaf spring, the third bumper spaced from the chassis rail in a third condition of the leaf spring arrangement and in contact with the chassis rail in a fourth condition of the leaf spring arrangement, contact between the third bumper and the chassis rail providing a third spring rate of the leaf spring arrangement.

9. The system of claim 8, wherein the third bumper is located proximate one of the first end and the second end of the first leaf spring.

10. The system of claim 9, wherein the third bumper is located proximate the first end of the first leaf spring, the system further comprising a fourth bumper operatively coupled to the first leaf spring and located proximate the second end of the first leaf spring.

11. The system of claim 10, wherein at least one of the first bumper, the second bumper, the third bumper and the fourth bumper is formed of rubber.

12. The system of claim 8, wherein the leaf spring is operatively coupled to the first end of the chassis rail with a first eye spring bushing, the leaf spring operatively coupled to the second end of the chassis rail with a second eye spring bushing.

13. The system of claim 12, wherein the first bumper is coupled to the first eye spring bushing.

14. The system of claim 8, wherein the first bumper is directly coupled to the second leaf spring.

* * * * *